United States Patent
Behara

(10) Patent No.: US 6,523,655 B1
(45) Date of Patent: Feb. 25, 2003

(54) SHIFT LINKAGE FOR A MARINE DRIVE UNIT

(75) Inventor: John W. Behara, Ponca City, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/950,309

(22) Filed: Sep. 10, 2001

(51) Int. Cl.$^7$ ............................................... F16D 21/04
(52) U.S. Cl. ........................ 192/21; 192/48.91; 192/51; 192/93 R
(58) Field of Search ........................ 192/21, 51, 93 R, 192/48.91

(56) References Cited

U.S. PATENT DOCUMENTS

| | | | | |
|---|---|---|---|---|
| 3,269,497 A | * | 8/1966 | Bergstedt | 192/51 |
| 4,244,454 A | * | 1/1981 | Bankstahl | 192/21 |
| 4,257,506 A | * | 3/1981 | Bankstahl | 192/21 |
| 4,630,719 A | | 12/1986 | McCormick | 192/21 |
| 4,679,882 A | | 7/1987 | Gray et al. | 192/21 |
| 5,035,664 A | * | 7/1991 | Bland et al. | 440/75 |
| 5,829,564 A | | 11/1998 | Meisenburg et al. | 192/21 |

* cited by examiner

Primary Examiner—Saúl Rodriguez
(74) Attorney, Agent, or Firm—William D. Lanyi

(57) ABSTRACT

A shift linkage for a marine drive unit is provided with a groove that is aligned along a path which is nonperpendicular to an axis of rotation of the shift linkage. The groove, and its nonperpendicularity to the axis of rotation, allow a detent ball to smoothly roll or slide along the groove. This relationship helps to maintain the shift linkage in a desired vertical position as it passes from one gear selection position to another.

17 Claims, 4 Drawing Sheets

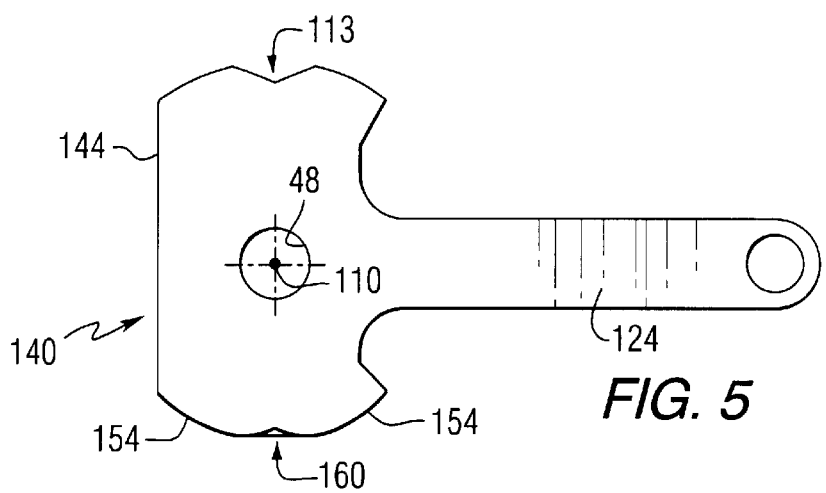
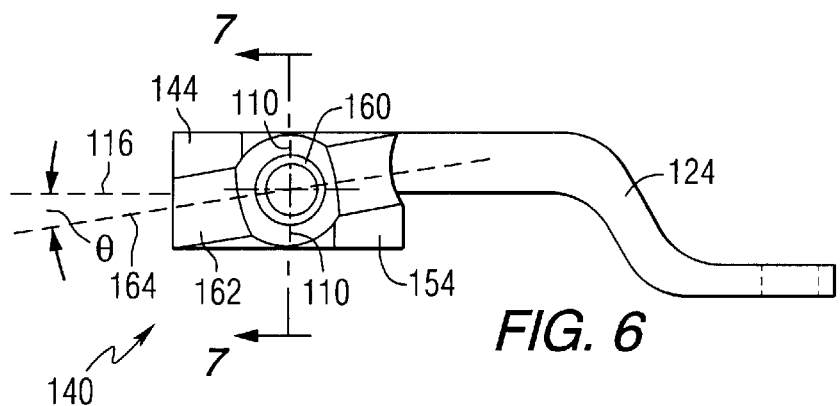
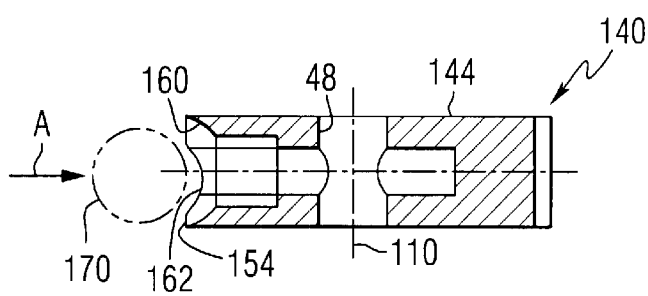
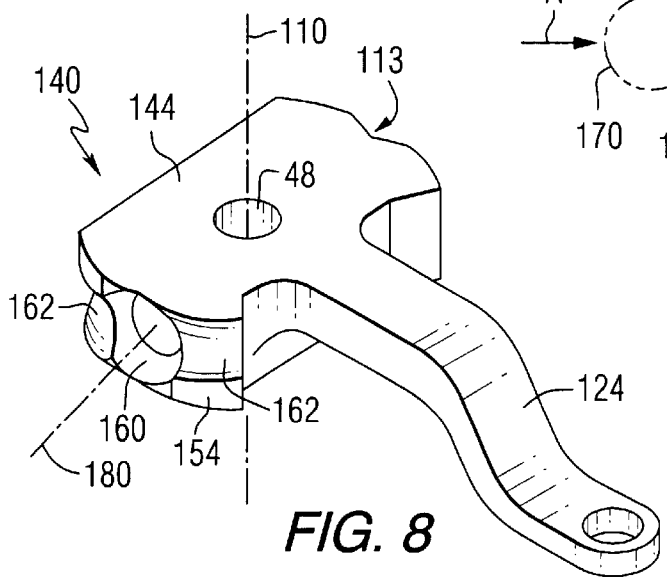
FIG. 5
FIG. 6
FIG. 7
FIG. 8

SHIFT LINKAGE FOR A MARINE DRIVE UNIT

BACKGROUND OF THE INVENTION

1. Field of the Invention

The present invention is generally related to a shifting mechanism for a marine drive unit and, more particularly, to a mechanism with a shift linkage which facilitates the movement of the shift linkage and connected components from forward to neutral gear positions, reverse to neutral gear positions, and into either forward or reverse gear positions from a neutral gear position.

2. Description of the Prior Art

Many different types of marine drive shift mechanisms are well known to those skilled in the art. U.S. Pat. No. 5,829,564, which issued to Meisenburg et al on Nov. 3, 1998, discloses a marine drive shift mechanism with chamfered shift rings, stepped cams, and a self-centering clutch. The marine drive shift mechanism includes a shift ring having a chamfer zone along an arcuate portion of its outer circumference facilitating ease of shifting. A stepped camming surface provides step function shifting movement. Neutral positioning notches are provided on the clutch sleeve to improve clutch sleeve placement when the shift mechanism is in neutral.

U.S. Pat. No. 4,679,682, which issued to Gray et al on Jul. 14, 1987, discloses a marine drive shift mechanism with a detent canister centered neutral. The marine drive is provided with a shift mechanism including a detent canister assembly. A cylindrical canister contains a ball biased by a pair of concentric springs into engagement with a shifter lever arm to center the latter in a neutral position. The canister assembly is a self contained modular unit inserted into the marine drive housing. The cylindrical canister has a left end wall with an aperture therethrough and has an open right end containing the ball. The first spring bears at its right end against the ball and extends axially leftward through the aperture in the left end wall of the canister and bears at its left end against the housing. The second outer concentric spring bears at its right end against the ball and is entirely within the canister and bears at its left end against the left end wall of the canister. Upon axial leftward depression of the ball by the shift lever arm, the first inner spring compresses and the canister moves axially leftward until the left wall of the canister strikes the housing wall to close a tolerance accommodating gap, whereafter both springs compress during further leftward depression of the ball. Particular constructional details of the shift lever arm are also disclosed.

U.S. Pat. No. 4,630,719, which issued to McCormick on Dec. 23, 1986, discloses a torque aided pulsed impact shift mechanism. A cone clutch sleeve on a main shaft is moved axially between forward and reverse counter-rotating gears by a yoke having mirror-image oppositely tapered cams on opposite sides thereof which are selectively rotatable to engage eccentric rings on the forward and reverse gears. This engagement drives the yoke away from the one engaged gear and toward the other gear to in turn drive the clutch sleeve out of engagement with the one gear such that torque applied through the cam engaged gear ring assists clutch disengagement of the one gear such that requisite shift force decreases as speed and torque increases. The eccentric face surface of each ring actuates the yoke and drives the sleeve member out of engagement with the one gear and into engagement with the other gear with a pulsed impact hammer effect due to the eccentricity of the face surface as it rotates in a circumferential plane about the main shaft.

The patents described above are hereby expressly incorporated by reference in the description of the present invention.

In marine drive transmissions similar to those described in the referenced United States patents, the various components of the marine drive unit must move from a neutral gear position to either forward or reverse gear positions as the transmission is shifted by an operator. As the various components move between these distinct positions, they pass through intermediate positions in which the shifting components are not completely in any specific gear position. In other words, as the transmission moves from a neutral gear position to a forward gear position, it must pass through intermediate and possibly indeterminate positions which are neither the neutral nor the forward gear positions. Similarly, as the transmission components move from a neutral gear position to a reverse gear position, they also must pass through intermediate positions which are neither the neutral nor the reverse gear positions. As the marine drive unit components move through these intermediate positions, certain disadvantageous conditions can occur, such as rapid oscillation between neutral and either forward or reverse gear positions. This rapid oscillation can cause a chatter noise and could possibly have a deleterious effect on the various components of the marine drive unit.

It would therefore be significantly advantageous if an improvement could be provided for a marine drive unit which aided the movement of the components from one gear position to another gear position in order to more quickly pass through the intermediate positions.

SUMMARY OF THE INVENTION

A marine drive unit made in accordance with the preferred embodiment of the present invention comprises a housing structure and a shifter shaft supported within the housing structure. The shifter shaft is rotatable about an axis and movable along the axis. The axis is generally vertical. A shift linkage has a depression formed in its surface.

The shift linkage is rigidly attached to the shifter shaft, whereby rotation of the shift linkage relative to the axis causes the shifter shaft to rotate about the axis into at least three alternative rotational positions about the axis.

A detent assembly is mounted in the housing and it comprises an insert member and a biasing member. The insert member is urged into engagement with the depression formed in the surface of the shift linkage. In a preferred embodiment of the present invention, the insert member is a spherical ball and the ball is urged toward the surface of the shift linkage by a spring which serves as the biasing member. This urging of the ball into the depression in the surface of the shift linkage centers the shift mechanism into a preselected one of the three alternative rotational positions about the axis. The insert member, or ball, is inhibited by the housing from moving in a direction parallel with the axis of the shifter shaft.

A groove is formed in the surface of the shift linkage. The groove extends along a path in the surface of the shift linkage which intersects the depression. The groove is nonperpendicular to the axis of the shifter shaft and is shaped to receive the insert member in sliding or rolling relation within the groove when the shift linkage is rotated about the axis away from the preselected one of the three alternative rotational positions about the axis. The nonperpendicular relationship between the groove and the axis permits the insert member to remain within the groove, under urging by the biasing member, as the shift linkage rotates about the axis and moves in a direction parallel to the axis in coordination with the shifter shaft.

In a particularly preferred embodiment of the present invention, the depression is generally circular in cross section with a concave surface that is a portion of a sphere. The shift linkage comprises a head and an arm which extends away from the head in a direction away from the shifter shaft.

The insert member can have a spherical surface to facilitate its movement into and out of the depression and, in some embodiments, the insert member can be a ball. The three alternative rotational positions about the axis comprise a forward gear position, a reverse gear position, and a neutral gear position. The preselected one of the three alternative rotational positions about the axis is the neutral gear position. This preselected one of the alternative rotational positions is the position at which the ball is received in the depression within the surface of the shift linkage. The groove, in a preferred embodiment of the present invention, has a rounded bottom surface shaped to conform with the generally spherical surface portion of the insert member.

BRIEF DESCRIPTION OF THE DRAWINGS

The present invention will be more fully and completely understood from a reading of the description of the preferred embodiment of the present invention in conjunction with the drawings, in which:

FIG. 5 is a top view of a shift linkage of the present invention;

FIG. 6 is a side view of a shift linkage of the present invention;

FIG. 7 is a section view of FIG. 6;

FIG. 8 is an isometric view of a shift linkage made in accordance with the principles of the present invention.

DESCRIPTION OF THE PREFERRED EMBODIMENT

Figure 1:
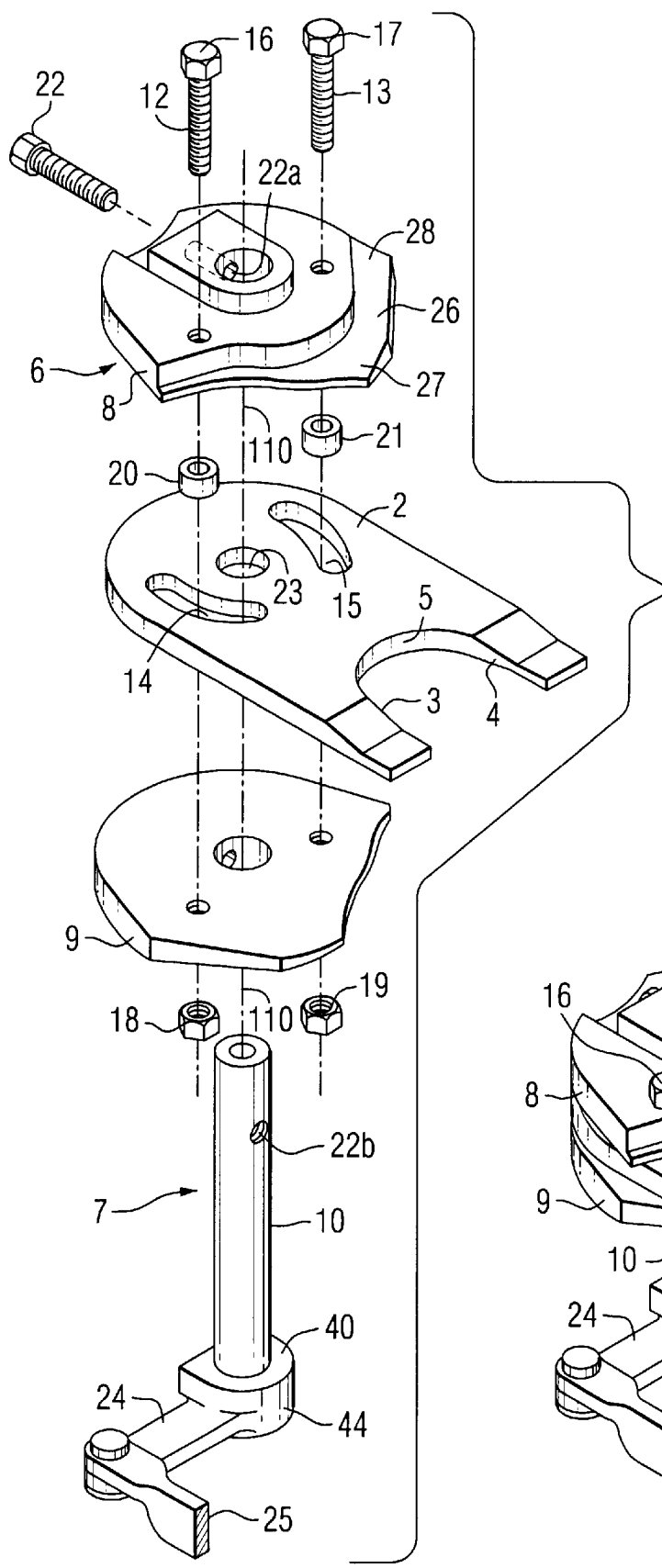
FIGS. 1 and 2 show isometric representations of a shifting mechanism known in the prior art.

Throughout the description of the preferred embodiment of the present invention, like components will be identified by like reference numerals.

Figure 2:
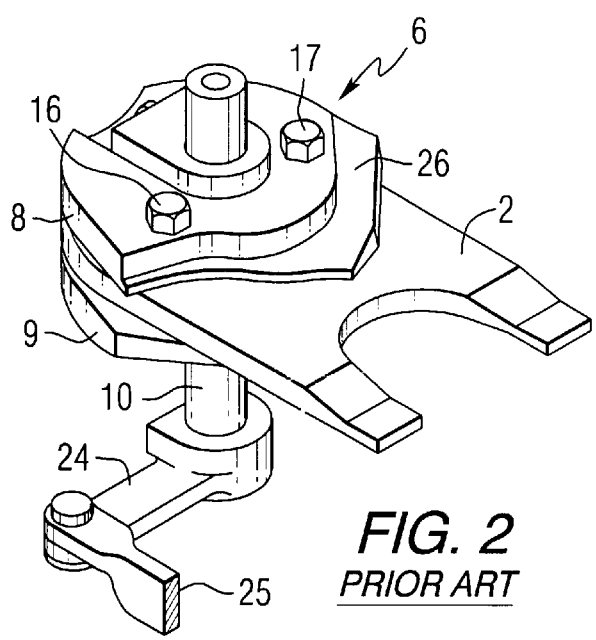

FIGS. 1 and 2 show shifting mechanisms which are well known to those skilled in the art. The device illustrated in FIG. 2 is described in explicit detail in U.S. Pat. No. 4,679,682. Also, the general arrangement and the relationship of the components illustrated in FIGS. 1 and 2 are also discussed in U.S. Pat. Nos. 4,630,719 and 5,829,564. FIG. 1 is an exploded isometric view of FIG. 2 and both FIGS. 1 and 2 illustrate a shifting mechanism for a marine drive unit for which the present invention provides an improvement, as will be described in greater detail below.

With reference to FIGS. 1 and 2, a yoke 2 is a split fork with tines, 3 and 4, and a central portion 5. A cam device 6 is operatively associated with the yoke 2 and an actuating device 7, which comprises a shifter shaft 10, is provided for actuating the device into engagement with one of the gears in the marine drive unit. Although the actual gears are not shown in FIGS. 1 and 2, the forward and reverse gears are illustrated in detail and described in the United States patents described above which are incorporated by reference in this description. The cam structure 6 comprises first and second cams, 8 and 9, on opposite sides of the yoke 2. The first cam 8 faces a reverse gear in the marine drive unit and the second cam 9 faces a forward gear in the unit. The actuating means 7 comprises the shifter shaft 10 which is generally parallel to a main drive shaft within the marine unit. This actuating means 7 rotates cams 8 and 9 relative to yoke 2 about the central axis of rotation of the shifter shaft 10. Shifter shaft 10 is supported by a housing, which will described in greater detail below, and is disposed in parallel association with a drive shaft of the marine drive unit. Bolts 12 and 13 extend through apertures 14 and 15 in the yoke 2. They are associated with nuts 18 and 19 to attach the components to each other. Annular spacer sleeves 20 and 21 are provided around bolts 12 and 13 and extend through respective apertures, 14 and 15, in the yoke 2 and engage cams 8 and 9 at the axial ends of the sleeves, 20 and 21. Spacer sleeves, 20 and 21, have a height or thickness slightly greater than the thickness of yoke 2 in order to space the first and second cams, 8 and 9, apart by a distance slightly greater than the thickness of the yoke 2. This allows the first and second cams to rotate in unison relative to yoke 2 with minimal frictional retardation.

Cam 8 is mounted to the shifter shaft 10 by set screw 22 which extends through aperture 22A in cam 8 and is received in a threaded aperture in the shifter shaft 10. A set screw can be provided for either or both of cams, 8 and 9, although only a single set screw is required in most applications because the cams are locked together by bolts 12 and 13 and they rotate in unison. Apertures 14 and 15 have an arcuate configuration defining an arc about a center of shifter shaft 10 and the central axis through aperture 23 of the yoke 2. The first and second cams, 8 and 9, may therefore rotate about the axis of the shifter shaft 10 without rotation of the yoke 2 about the axis. The shifter shaft 10 is operated through a lever arm 24 and a linkage 25 which is pivotally mounted to the arm 24 by a pivot pin. The shifter shaft 10 has a central neutral position and both forward and reverse positions on opposite sides of the neutral position. In the orientation shown in FIG. 1, clockwise rotation of the shifter shaft 10 provides the forward position and counterclockwise rotation of the shifter shaft 10 provides the reverse position.

With continued reference to FIGS. 1 and 2, cam 8 has an arcuate tapered camming surface 26 which has a reduced height portion 27 axially aligned with and spaced from the reverse gear of the marine drive unit when the actuating means 7 is in the neutral position. It has an increased height portion 28 axially aligned with and engaging the reverse gear of the marine unit when actuating means 7 is rotated to a forward gear position, such that engagement of camming surface 26 of cam 8 with the reverse gear of the marine drive unit causes yoke 2 to be driven axially downward away from the reverse gear in the marine drive unit toward a first gear. The second cam 9 has a tapered arcuate camming surface having a reduce height portion axially aligned with and spaced from a forward gear of the drive unit when actuating means 7 is in the neutral position and it has an increased height portion axially aligned with and engaging the forward gear when the actuating means 7 is rotated to the reverse position.

The operation of the components shown in FIGS. 1 and 2 are well known to those skilled in the art and a further description of those components will not be provided herein. The United States patents described above and expressly incorporated by reference in this description provide a detailed and explicit disclosure of the characteristics and relationships of all of the components shown in FIGS. 1 and 2.

Figure 3:
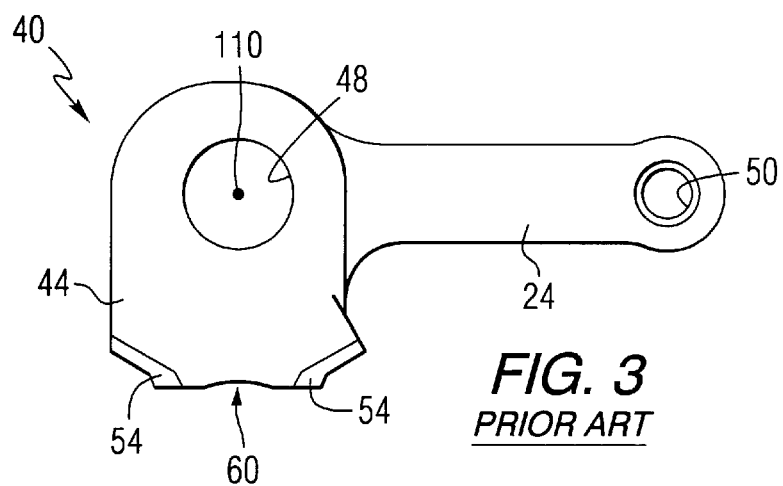
FIG. 3 shows a shift linkage known in the prior art.

FIG. 3 shows the shift linkage known in the prior art with its head 44 and arm 24. The arm 24 extends away from the head 44 in a direction away from the axis 110 of the shifter shaft 10. The shifter shaft 10, described above in conjunction with FIGS. 1 and 2, is received in cylindrical opening 48 formed in the head 44 of the shift linkage 40. The other cylindrical opening 50 shown in FIG. 3 and formed through the arm 24 receives a pivot pin that allows the linkage to be attached to the arm 24 as shown in FIGS. 1 and 2 and described above.

With continued reference to FIG. 3, the head 44 of the shift linkage 40 is provided with a surface 54 that is generally convex. A depression 60 is formed in the surface 54 for the purpose of receiving a detent member, such as a ball. This configuration is described in detail in U.S. Pat. No. 4,679,682.

Figure 4:
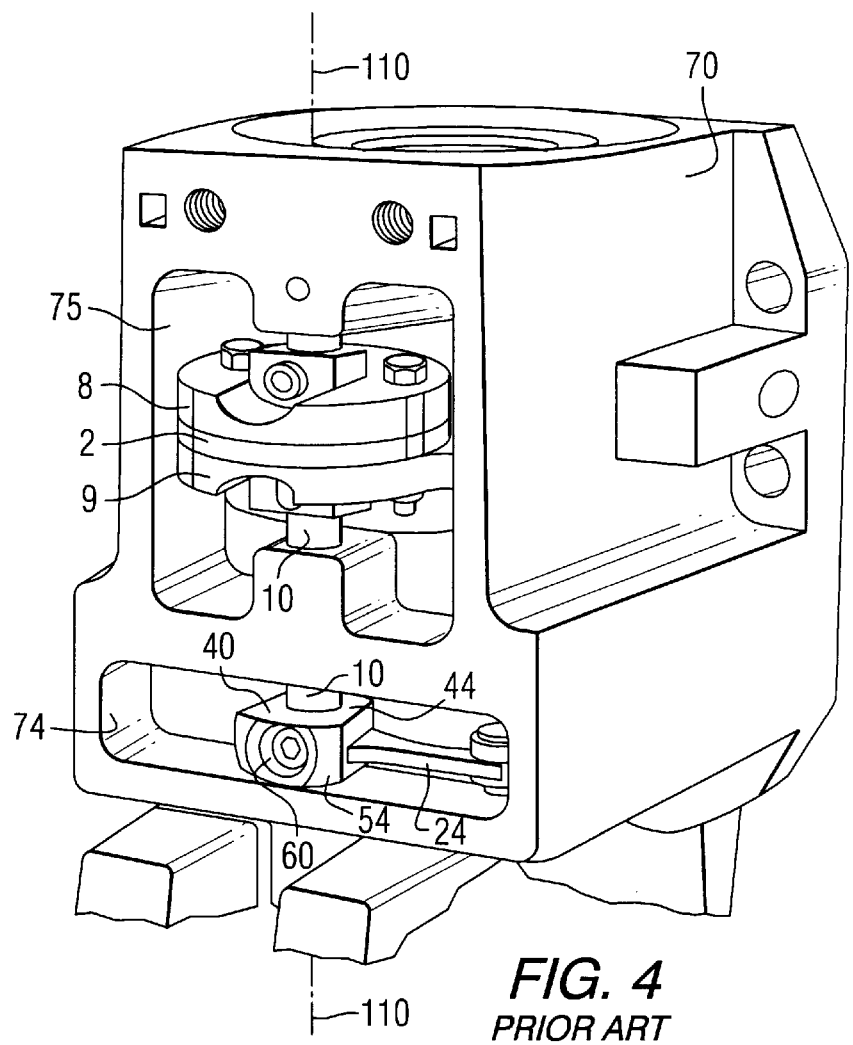
FIG. 4 is an isometric representation of a marine drive unit housing with a shifting mechanism and a shift linkage located within compartments of the housing.

FIG. 4 shows a housing 70 of a marine drive unit with a cover portion removed to show the positions of the yoke 2 and the cams, 8 and 9, disposed within the housing 70 with the shifter shaft 10 extending through the structure. In a different compartment 74 of the housing 70, the shift linkage 40 is attached to the shifter shaft 10 with its arm 24 extending away from the head 44. The depression 60 is shown formed within the generally convex surface 54 of the shift linkage 40. Axis 110 is the axis of rotation of the shifter shaft 10 and the shift linkage 40 when a force is exerted on arm 24. When shifter shaft 10 rotates about axis 110, cams 8 and 9 also rotate about the axis in order to actuate the yoke 2 for the purpose of moving the forward and reverse gear members into engagement or disengagement within the marine drive unit housing 70. The structure of those gears is not particularly relevant or limiting to the present invention and are not shown in detail herein. However, the United States patents described above and incorporated by reference in this description show that gearing arrangement in explicit detail and describes the operation of the gears.

FIG. 5 shows a top view of an improved shift linkage 140 made in accordance with the preferred embodiment of the present invention. Certain characteristics of the shift linkage 140 of the present invention are generally similar to those of the shift linkage 40 known in the prior art and described above. The present invention provides a head 144 with a cylindrical opening 48 shaped to receive the shifter shaft 10 as described above. An arm 124 extends from the head 144. A generally convex surface 154 of the shift linkage 140 is provided with a depression 160 shaped to receive a ball detent as will be described below. In one alternative embodiment of the present invention, a notch 113 is provided in a portion of the head 144 for the purpose of actuating a neutral position switch of the marine drive unit. However, the presence or absence of notch 110 is not limiting to the present invention.

FIG. 6 is a side view of the shift linkage 140 of the present invention. In FIG. 6, the convex surface 154 of the head 144 is illustrated along with the depression 160 formed in that surface. It should be understood that the surface 154, in a shift linkage 140 made in accordance with the present invention, need not be convex about line 116 for reasons which will be described below.

A groove 162 is formed in the surface 154 of the shift linkage 140. As can be seen, the groove 162 extends along a path parallel to line 164 which intersects the depression 160 and is nonperpendicular to the axis 110. This is illustrated in FIG. 6 by angle θ between lines 116 and 164. The purpose of groove 162 is to contain a detent ball, which will be described below, within the groove 162 as the head 144 of the shift linkage 140 rotates about axis 110 and also translates in a direction parallel to axis 110. In other words, in FIG. 6, the shift linkage 140 would naturally move upward or downward along axis 110 as it rotates about axis 110. This is caused by the interaction of the cams, 8 and 9, with the forward and reverse gears of the marine drive unit. The cam surfaces induce an axial translation in coordination with the rotation of the shifter shaft 10. This interaction is described in detail in the United States patent referenced above. As the shift linkage 140 is forced in an upward or downward direction along axis 110, the insert member, or detent ball, moves along groove 162 and remains within the groove. It should be understood that the detent ball does not move up or down in a path which is parallel to axis 110.

FIG. 7 is a section view of FIG. 6. The depression 160 can be seen in FIG. 7 as having an internal concave surface which is spherical and shaped to receive a ball detent 170. The ball 170 is urged, as represented by arrow A, in a direction perpendicular to axis 110 and toward the surface 154 of the shift linkage 140. Although not shown in FIG. 7, a fastener, such as an allen head screw or bolt, is received by the cylindrical openings shown in FIG. 7 to allow the shift linkage 140 to be rigidly attached to a shifter shaft 10 inserted through cylindrical opening 48 as described above.

FIG. 8 is an isometric view of the shift linkage 140. When a force is exerted against arm 124 of the shift linkage 140, the head 144 rotates about axis 110 which is the central axis of rotation of the shifter shaft 10 described above. Rotation of the shifter shaft 10 causes the shifter shaft 10 to move upward or downward in response to the interaction of the yoke 2 with the gears of the marine drive unit as described in detail in the United States patent incorporated above. Since the ball 170, described in conjunction with FIG. 7, is not movable in an upward or downward direction parallel to axis 110, the upward or downward movement of the shift linkage 140 forces the ball 170 to move along a contact path with surface 140 which is not in a plane that is perpendicular to axis 110. The groove 162 is formed in surface 154 along a path, or line 164, which is also nonperpendicular to axis 110 by a magnitude θ which accommodates the relative movement of the shift linkage 140 and the detent ball 170. The groove 162 intersects the depression 160. As the shift linkage 140 rotates about axis 110, the configuration of the groove 162 assists in maintaining the detent ball 170 within the groove 162 and also assists in maintaining the upward or downward position of the shift linkage 140 along axis 110. As the shift linkage 140 moves from one position to another, it passes through numerous intermediate positions in which the gear arrangement is not in a locked position, such as neutral, forward, or reverse. In these intermediate positions, the mechanism can possibly exhibit a tendency to oscillate between gear positions. However, the groove 162 avoids this oscillation by maintaining the upward or downward position of the shift linkage 140 and inhibiting its oscillating movement in a direction parallel to axis 110. In other words, the groove 162 works in synergistic cooperation with the operation of the cams, 8 and 9, described above in conjunction with FIGS. 1 and 2.

With references to FIGS. 1–8, the present invention provides a marine drive unit that comprises a housing structure 70 and a shifter shaft 10 which is supported within the housing structure 70. The shifter shaft 10 is rotatable about an axis 110 and is axially movable in a direction parallel to axis 110. A shift linkage 140 has a depression 160 formed in a surface 154 and the shift linkage 140 is rigidly attached to the shifter shaft 10, whereby rotation of the shift linkage 140 relative to the axis 110 causes the shifter shaft 140 to rotate about axis 110 into at least three alternative rotational positions about the axis 110. It should be understood that as the shift linkage 140 rotates about axis 110, it passes through an infinite number of positions of which only three have a desirable function. A neutral gear position is a central position with the depression 160 aligned with the detent ball 170 and with the detent ball 170 disposed within the depression 160 in surface 154. A forward gear position and a reverse gear position exists at two other rotational positions of the shift linkage 140, with the detent ball 170 out of the depression 160. However, as described above, when the detent ball 170 moves out of depression 160 and toward either the forward or reverse gear positions, it must pass through an infinite number of intermediate positions that are not defined as one of the three alternative rotational positions of the axis 110 for which a definite function is identified. It is during the movement of the shift linkage 140 through these intermediate positions that the rapid oscillation and vibration can occur because of the indeterminate characteristic of those intermediate positions. The cooperation of the groove 162 with the detent ball 170 helps to maintain the vertical position of the shift linkage 140 as it passes through these intermediate positions and helps to inhibit the oscillatory behavior described above.

A detent assembly, such as that described in U.S. Pat. No. 4,679,682, is mounted in the housing 70 and comprises an insert member, such as detent ball 170, and a biasing member whose function is to provide the force identified by arrow A in FIG. 7. This biasing member can be a spring as described in U.S. Pat. No. 4,679,682. The insert member, or ball 170, is urged into engagement with the depression 160 by the biasing member in order to center the shift linkage into a preselected one of the three alternative rotational positions about the axis. This preselected one of the alternative rotational positions is a neutral gear position when the detent ball 170 is in depression 160. The insert member, or detent ball 170, is fixed within housing 70 so that it only has one degree of movement which is generally perpendicular to axis 110. In other words, as represented by arrow A in FIG. 7, the detent ball 170 can move toward surface 154 of the shift linkage 140 or away from it in order to insert the detent ball 170 into depression 160 in response to the urging of the biasing member, or spring. The detent ball 170 can not move upward or downward within housing 70 in a direction parallel to axis 110 and it can not move in any other direction perpendicular to axis 180 in FIG. 8 along which arrow A in FIG. 7 acts.

The groove 162 is formed in surface 154 of the shift linkage 140 and extends along a path 164 in the surface 154 which intersects the depression 160 and is nonperpendicular to the axis 110. The groove is shaped to receive the insert member, or detent ball 170, in sliding or rolling relation within the groove 162 when the shift linkage 140 is rotated about axis 110 away from the preselected one of the three alternative rotational positions about the axis, which is the neutral gear position. The nonperpendicular relationship between the groove 162 and the axis 110 permits the detent ball 170 to remain within the groove 162 during the movement of the shift linkage 140 about the axis 110 and parallel to the axis 110 in coordination with the shifter shaft 10. The depression 162 is generally circular in cross section and has an internal surface which is generally spherical.

Figure 9:
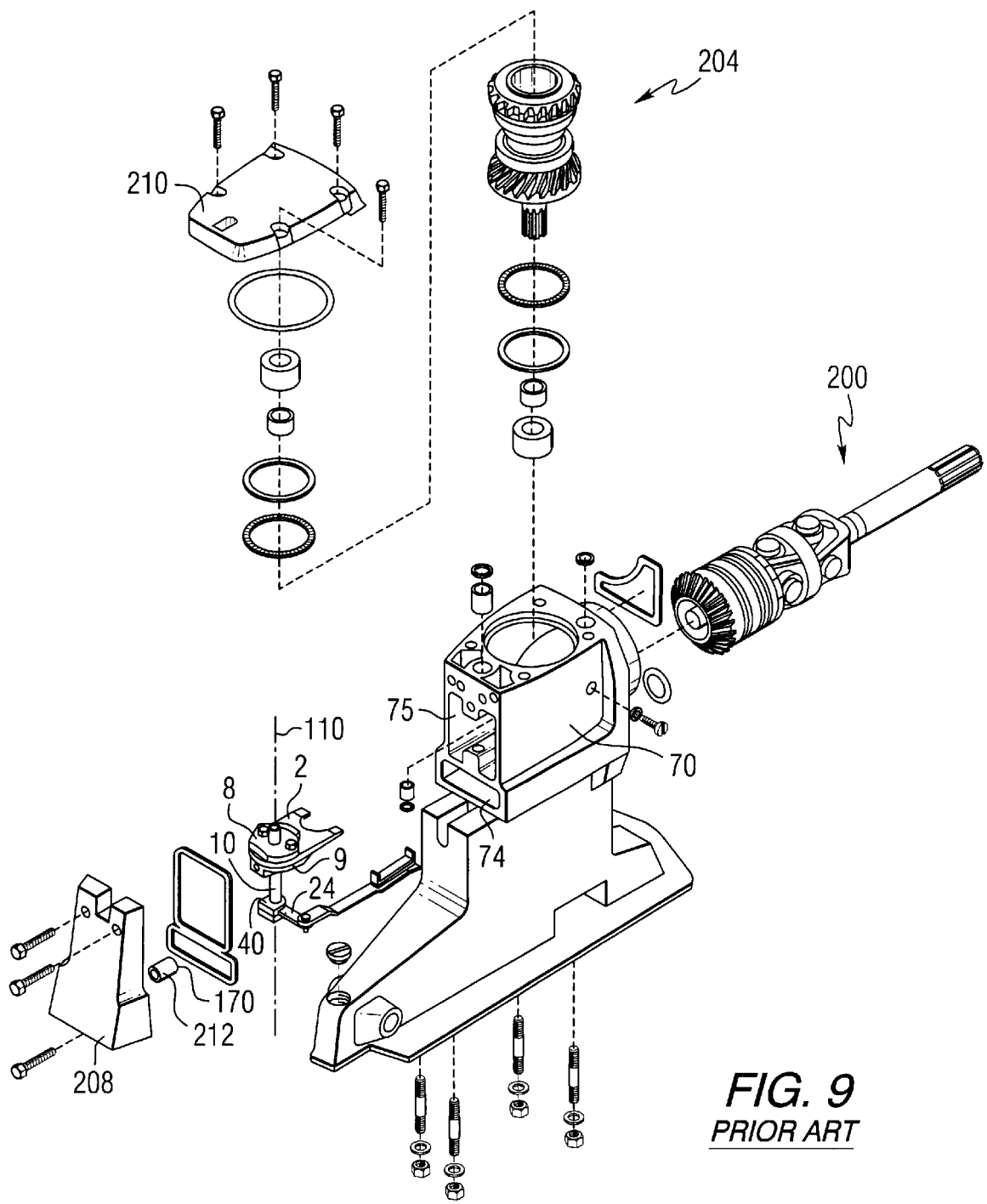
FIG. 9 is an exploded isometric view of a marine drive unit with which the present invention can be used to provide improved operation.

FIG. 9 is an isometric exploded view of a portion of a marine drive unit with which the present invention can be used. As described above in conjunction with FIG. 4, the shifter assembly comprises the yoke 2 and cams, 8 and 9. The shifter shaft 10 connects the upper portion of this assembly to the shift linkage 40. In FIG. 9, the arm 24 is shown extending from the head of the shift linkage 40 and being attached rotatably to a component which is capable of exerting a force on the arm 24 to cause it to rotate about its axis 110. The upper portion of the shifter assembly is received in an upper cavity 75 and the shift linkage 40 is received in the lower cavity 74. The shifter shaft 10 extends through the hole between the upper and lower cavities, 75 and 74. The improved shift linkage, as described above in conjunction with FIGS. 5–8, serves as a direct replacement to the shift linkage known to those skilled in the art.

Also shown in FIG. 9 is the U-joint assembly 200 and the clutch assembly 204. The clutch assembly 204 is moved upward or downward, in response to the yoke 2 and this upward or downward displacement of the clutch assembly 204 moves the forward and reverse gears of the clutch assembly 204 into engagement with the drive gear of the U-joint assembly. As described above, the upward and downward movement of the yoke 2 results from the cam surfaces of cams 8 and 9 and the rotation of the shifter shaft 10 about axis 110.

Also shown in FIG. 9 is the back cover 208 and the top cover 210 of the driveshaft housing 70. The other hardware shown in FIG. 9, including the washers, sleeves, bearings, races, seals, plugs, nuts, and screws, are well known to those skilled in the art and will not be described herein. However, it is important to recognize that the detent ball 170 and its associated detent canister 212, are fixed with respect to the back cover 208 and are not moveable in directions upward or downward parallel to axis 110 or in a port/starboard direction perpendicular to axis 110. The ball detent 170 is moveable in a direction toward and away from the depression 60. A spring (not shown in FIG. 9) within the detent canister 212 urges the ball detent 170 in a direction toward the shift linkage 40. As the shift linkage 40 is rotated in response to a force exerted on its arm 24, the cams, 8 and 9, cause the shifter assembly to move upward and downward along axis 110 simultaneously with the rotation of the shifter shaft 10 about axis 110. This upward and downward movement of the shifter assembly and the shift linkage 40 causes the surface 54 of the shift linkage 40 to move upward or downward relative to the ball detent 170. The groove 162 described above in conjunction with FIGS. 6–8, facilitates this relative movement and maintains the ball detent 170 within the groove 162.

Although the present invention has been described in particular detail and illustrated to show a most preferred embodiment, it should be understood that s alternative embodiments are also within its scope.

I claim:

1. A marine drive unit, comprising:
   a housing structure;
   a shifter shaft supported within said housing structure, said shifter shaft being rotatable about an axis and axially movable along said axis;

a shift linkage having a depression formed in a surface of said shift linkage, said shift linkage being rigidly attached to said shifter shaft, whereby rotation of said shift linkage relative to said axis causes said shifter shaft to rotate about said axis into at least three alternative rotational positions about said axis;

a detent assembly mounted in said housing, said detent assembly comprising an insert member and a biasing member, said insert member being urged into engagement with said depression by said biasing member in order to center said shift linkage into a preselected one of said at least three alternative rotational positions about said axis, said insert member being inhibited from moving in a direction parallel with said axis;

a groove formed in said surface of said shift linkage, said groove extending along a path in said surface which intersects said depression and is nonperpendicular to said axis, said groove being shaped to receive said insert member in sliding relation within said groove when said shift linkage is rotated about said axis away from said preselected one of said at least three alternative rotational positions about said axis, said nonperpendicular relationship between said groove and said axis permitting said insert member to remain within said groove as said shift linkage rotates about said axis and moves axially along said axis in coordination with said shifter shaft.

2. The marine drive unit of claim 1, wherein:
said depression is generally circular in cross section.

3. The marine drive unit of claim 1, wherein:
said shift linkage comprises a head and an arm which extends away from said head in a direction away from said shifter shaft.

4. The marine drive unit of claim 1, wherein:
said insert member having a spherical surface.

5. The marine drive unit of claim 4, wherein:
said insert member is a ball.

6. The marine drive unit of claim 1, wherein:
said at least three alternative rotational positions about said axis comprise a forward gear position, a reverse gear position, and a neutral gear position.

7. The marine drive unit of claim 6, wherein:
said preselected one of said at least three alternative rotational positions about said axis is said neutral gear position.

8. The marine drive unit of claim 1, wherein:
said groove has a rounded bottom surface shaped to conform with a generally spherical surface portion of said insert member.

9. A marine drive unit, comprising:
a housing structure;
a shifter shaft supported within said housing structure, said shifter shaft being rotatable about an axis and axially movable along said axis;
a shift linkage having a depression formed in a surface of said shift linkage, said shift linkage being rigidly attached to said shifter shaft, whereby rotation of said shift linkage relative to said axis causes said shifter shaft to rotate about said axis into at least three alternative rotational positions about said axis;

a detent assembly mounted in said housing, said detent assembly comprising an insert member and a biasing member, said insert member being a ball which is urged into engagement with said depression by said biasing member in order to center said shift linkage into a preselected one of said at least three alternative rotational positions about said axis, said insert member being inhibited from moving in a direction parallel with said axis;

a groove formed in said surface of said shift linkage, said groove extending along a path in said surface which intersects said depression and is nonperpendicular to said axis, said depression being generally circular in cross section, said groove being shaped to receive said insert member in sliding relation within said groove when said shift linkage is rotated about said axis away from said preselected one of said at least three alternative rotational positions about said axis, said nonperpendicular relationship between said groove and said axis permitting said insert member to remain within said groove as said shift linkage rotates about said axis and moves axially along said axis in coordination with said shifter shaft.

10. The marine drive unit of claim 9, wherein:
said shift linkage comprises a head and an arm which extends away from said head in a direction away from said shifter shaft.

11. The marine drive unit of claim 10, wherein:
said at least three alternative rotational positions about said axis correspond to a forward gear position, a reverse gear position, and a neutral gear position.

12. The marine drive unit of claim 11, wherein:
said preselected one of said at least three alternative rotational positions about said axis corresponds to said neutral gear position.

13. The marine drive unit of claim 12, wherein:
said groove has a rounded bottom surface shaped to conform with a generally spherical surface portion of said insert member.

14. A marine drive unit, comprising:
a housing structure;
a shifter shaft supported within said housing structure, said shifter shaft being rotatable about an axis and axially movable along said axis;
a shift linkage having a depression formed in a surface of said shift linkage, said shift linkage being rigidly attached to said shifter shaft, whereby rotation of said shift linkage relative to said axis causes said shifter shaft to rotate about said axis into at least three alternative rotational positions about said axis;

a detent assembly mounted in said housing, said detent assembly comprising an insert member and a biasing member, said insert member being a ball which is urged into engagement with said depression by said biasing member in order to center said shift linkage into a preselected one of said at least three alternative rotational positions about said axis, said insert member being inhibited from moving in a direction parallel with said axis;

a groove formed in said surface of said shift linkage, said groove extending along a path in said surface which intersects said depression and is nonperpendicular to said axis, said depression being generally circular in cross section, said groove being shaped to receive said insert member in sliding relation within said groove when said shift linkage is rotated about said axis away from said preselected one of said at least three alternative rotational positions about said axis, said nonperpendicular relationship between said groove and said axis permitting said insert member to remain within said groove as said shift linkage rotates about said axis and moves axially along said axis in coordination with said shifter shaft, said groove having a rounded bottom surface shaped to conform with a generally spherical surface portion of said insert member.

15. The marine drive unit of claim 14, wherein:

said shift linkage comprises a head and an arm which extends away from said head in a direction away from said shifter shaft.

16. The marine drive unit of claim 15, wherein:

said at least three alternative rotational positions about said axis correspond to a forward gear position, a reverse gear position, and a neutral gear position.

17. The marine drive unit of claim 16, wherein:

said preselected one of said at least three alternative rotational positions about said axis corresponds to said neutral gear position.

* * * * *